United States Patent [19]

Cholmar

[11] 4,415,394

[45] Nov. 15, 1983

[54] METHOD AND APPARATUS FOR UNIFORM CORONA DISCHARGE BONDING

[75] Inventor: Sidney Cholmar, Stamford, Conn.

[73] Assignee: National Can Corporation, Chicago, Ill.

[21] Appl. No.: 322,514

[22] Filed: Nov. 18, 1981

[51] Int. Cl.³ .................... B32B 31/28; B05D 3/14
[52] U.S. Cl. .................... 156/379.8; 156/274.6; 156/379.6; 427/39; 250/325; 219/10.53; 219/10.81
[58] Field of Search .............. 156/272.6, 274.4, 274.6, 156/308.2, 379.6, 379.8; 427/40, 41, 39; 219/10.53, 10.81; 250/324, 325, 326

[56] References Cited

U.S. PATENT DOCUMENTS

| | | | |
|---|---|---|---|
| 2,969,463 | 1/1961 | McDonald | 250/324 |
| 3,391,044 | 7/1968 | Kaghan et al. | 156/272.6 |
| 3,959,567 | 5/1976 | Bradley | 156/379.6 |
| 4,096,013 | 6/1978 | Lutzmann et al. | 156/309.9 |

FOREIGN PATENT DOCUMENTS 674718  11/1963  Canada ........................ 156/272.6

OTHER PUBLICATIONS

Pennebaker, W. B., "Improving Adhesion Between Glass Substrates and Metal Films", *IBM Technical Disclosure Bulletin*, vol. 16, No. 10 (3-1974), p. 3426.

Lorona-discharge treatment process and apparatus, Saxenmeyer, Jr. *IBM Technical Disclosure Bulletin*, vol. 19, No. 5 10-1976, p. 1644.

Primary Examiner—Edward C. Kimlin
Assistant Examiner—F. K. Wine
Attorney, Agent, or Firm—Robert A. Stenzel

[57] ABSTRACT

A method and apparatus for providing uniform corona bonding between and across the width of a plurality of layers of material each having a generally uniform thickness and width whereby, if desired, the plurality of layers may be easily and uniformly separated. Uniformity of bond is achieved by configuring the outer ends of an otherwise straight electrode, placed at an optimum effective bonding position, in proportion to the higher corona energy levels found to occur at the ends of the corona electrode bar.

9 Claims, 2 Drawing Figures

METHOD AND APPARATUS FOR UNIFORM CORONA DISCHARGE BONDING

DESCRIPTION

1. Technical Field

This invention generally relates to corona bonding of layers of plastic material by means of a corona discharge, and more particularly, concerns a method and apparatus for providing a substantially uniform bond between the layers of the material across the width of the materials being bonded.

2. Background Prior Art

U.S. Pat. Nos. 3,823,061 and 4,096,013 disclose the manufacture of multilayered material by subjecting the various layers of material to a corona discharge and bringing them into contact with each other and are incorporated herein by reference. Both are commonly assigned with the instant application.

Such corona bonded multilayered plastic material may be used, among other things, to produce an intermediate liner for the manufacture of Co-Pak ® brand multilayered containers. In that process, the liners are thermo-formed and cut from strips of the corona bonded multilayered plastic material after which the remaining portion of these strips are delaminated, reground and reused in the manufacture of new material. Such recovery of the layers of material in the strip has a significant impact on the economic viability and competitiveness in the marketplace of the Co-Pak ® brand container.

In the process of delaminating the strip of material bonded together through the use of known prior art apparatus and methods, it was observed that the edge portion of these strips of material extending along opposite outside edges had significantly greater adhesion to each other than did the inward, central portions of the strip. Consequently, on occasion, the edge portions of these strips did not delaminate but rather the central portion, where the adhesion permitted delamination, tore away from the edge causing disruption of the delaminating process. Prior to the development of the invention disclosed herein, when this situation occurred, the energy level of the corona discharge was reduced to provide the desired delaminable bond at the outer edges. In such instances, however, it was noted that the adhesion of the inward central portions became weaker than desired and such nonuniform adhesion created problems in the manufacture of the Co-Pak ® brand containers. Thus, the process required a uniform bonding force between the layers of material across the entire width of the strip. To applicant's knowledge, an apparatus and method for continuous uniform bonding force across the width of the strip was not known.

It would be understood from a review of the patents above mentioned, that the adhesion between the layers of material is subject to many variables including, without limitation, the composition, angle, thickness and speed of the plastic material being extruded; the size, temperature and conductivity of a chrome roll on to which the plastic material is extruded; the size, configuration, position, and energy level of the electrodes; as well as the spatial relationship between the various elements in the process. For additional details of these variables, reference may be had to U.S. Pat. No. 4,096,013, and particularly column 13, et seq. Although there are many different ways to vary the effectiveness of the adhesion, it has been found that there is generally one preferred, optimum relationship of all factors involved which produces maximum bonding of specific materials in a specific manufacturing situation. For purposes of discussion, the point at which the various variables come together in a relationship that produces maximum effectiveness shall be referred to as the "optimum point or line".

Nevertheless, at this optimum point, the higher level of bond along the opposite outer edges of the strip of material remained a matter of concern.

The higher edge bonding strength was found to be caused by a concentration of electrical energy at the sharp points of the straight corona discharge electrode that extended across the width of the strip of material being formed. Rounding the sharp points helped a little but still left a very noticeable stronger bonding force at the edge. Moving the ends of the straight electrode inwardly from the edge also was not effective as it left an area along the edge with no bond. Moreover, moving the ends in the direction away from the material tended to produce sparking or streamers which could result in a nonuniform bonding in those areas. Thickening of the material at the edges was found effective for producing a more uniform bond; however, it was unacceptable in the specific thermoforming process to which the material was subsequently subjected. Accordingly, it was not satisfactory.

SUMMARY OF THE INVENTION

According to the invention herein a method and apparatus are disclosed for providing uniform corona bonding between and across the width of a plurality of layers of generally uniform thickness and width whereby, if desired, the plurality of layers may be uniformly separated. Uniformity of bond is achieved by configuring the outer ends of an otherwise straight electrode, placed at the optimum point, in proportion to the higher corona energy levels found to occur at the ends of the electrode.

In one aspect of this invention, an apparatus for progressively and uniformly bonding together at least two layers of material by passing the width of the materials through a corona energy field produced by an electrode includes the improvement wherein the opposite end portions of the electrode are bent at an angle to the remainder of the otherwise straight electrode. Bending of the end portions occurs in a plane generally perpendicular to the plane extending through the axis of a ground and the straight portion of the electrode. In practice it has been found that the bent end portions may be maintained straight and are preferably bent at one point at an angle in the range of about 8 to 12 degrees from the remainder of the straight electrode.

According to another aspect of the invention, there is provided a method of producing material of a plurality of layers having predetermined desired adhesion between the adjacent layers of material comprising the steps of subjecting the plurality of layers to a uniform corona bond across its width. The method may comprise the further steps of forming a plurality of intermediate components from the uniformly bonded material and separating the materials by breaking the uniform corona bond between the materials, as for example, by rolling them onto rollers on opposite sides of the laminated material.

BRIEF DESCRIPTION OF SEVERAL VIEWS OF DRAWINGS

FIG. 1 is a perspective diagrammatic sketch of one embodiment of the invention; and FIG. 2 is a side view of another embodiment of the invention similar to but slightly different from the embodiment of FIG. 1.

DETAILED DESCRIPTION

Figure 1:
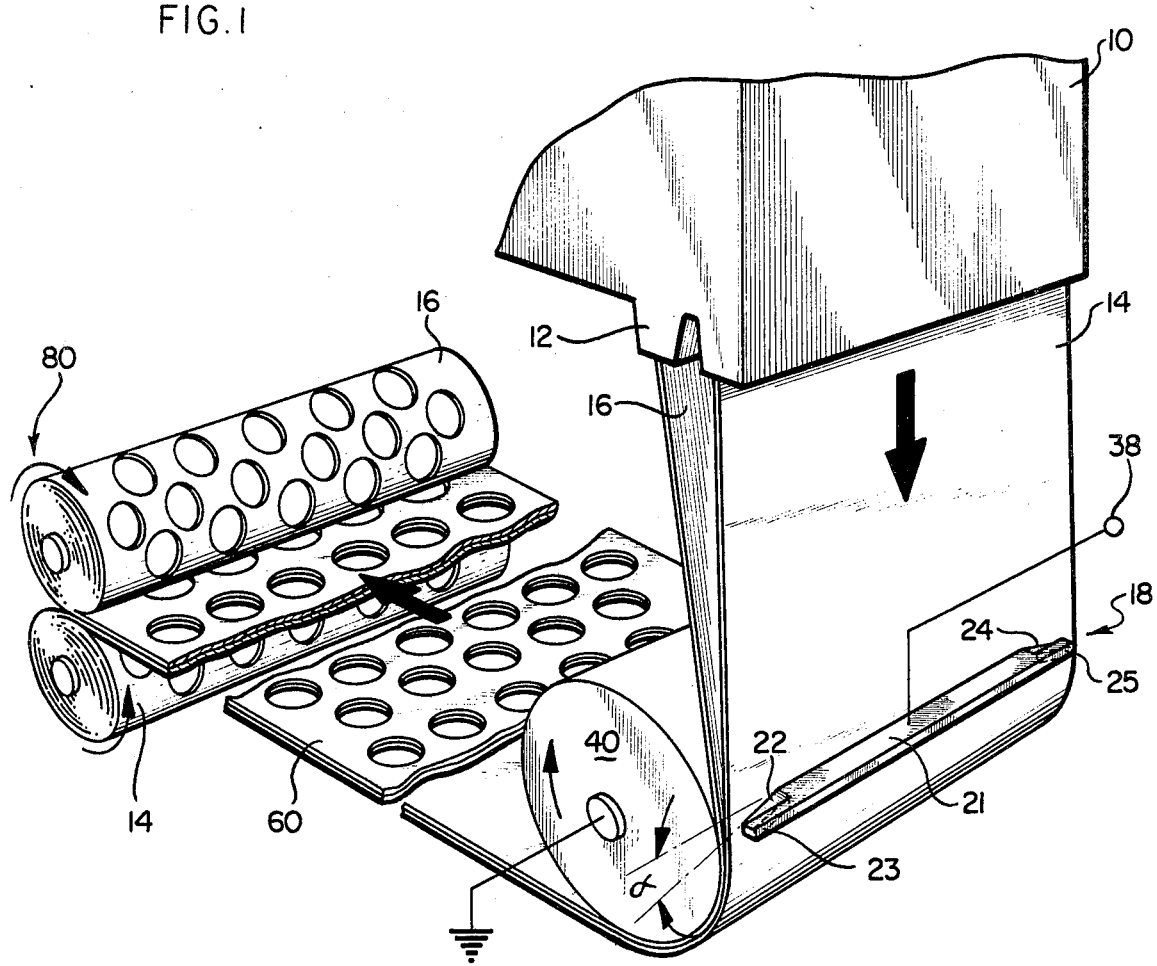

Referring to FIG. 1, there is shown a pair of extruders 10, 12, producing strips of hot plastic material 14, 16, respectively, which strips pass through a corona discharge formed around the electrode generally indicated at 18 by an electrical energy source 38. The strips of plastic material, which may be for example, polypropylene and barex, respectively, then proceed around a chrome surface chilled roll 40 grounded at 50 before moving to a point 60 where the thus bonded material may be used as for example by forming a separate item or items therefrom. It will be understood that the strip may, of course, be rolled, cut and stored prior to this schematic illustrated use step. After use, the material remaining will pass to a delaminating station 80 where it is separated into its original components 14, 16, by breaking the corona bond between the layers. Such breaking of the corona bond may be accomplished mechanically as by rolling the materials 14, 16, onto rollers as shown.

Details of the extrusion and prior bonding methods and apparatus may be understood by reference to the U.S. patents herein.

The electrode generally indicated at 18 in FIG. 1 is of a general bar configuration and movable in three dimensions. It is connected to a suitable electrical energy source schematically indicated at 38. As shown, the electrode has a straight central portion 21 and two end portions 22, 24, of equal length and bent at an angle to the straight portion 21. As previously mentioned, when the straight portion 21 is at the optimum point in relation to all of the other factors necessary to produce a desired bond, the strength of the bond between the layers of multilayered material may be varied by changing the energy level of the corona electrode. Thus, by increasing the energy level, the strength of the bond is increased and vice versa.

It was found that any movement of the electrode or portions thereof away from the optimum point resulted in a decrease at that point of the bonding strength between the materials passing through the corona discharge. Accordingly, it was discovered the higher electrical energy concentration levels found at the end of the electrode could be compensated for by moving the higher energy end portions away from the optimum point to a position where they were less effective. Accordingly, the net result was that there occurred across the width of the material passing through the corona discharge a uniform bond between the layers.

In the embodiment illustrated in FIG. 1, the higher end concentrations are compensated for by cutting the generally flat electrode bar 18, positioned with its inner edge adjacent to the material 14, inwardly from about the midpoint of each end lengthwise a predetermined distance, and bending the thus formed portions 22, 24, adjacent the material 14, downwardly through a predetermined angle alpha ($\alpha$) out of the line of the axis of the straight portion 21 of the bar. With this apparatus construction, a satisfactory uniform delaminable bond was produced. The remaining straight portions 23 and 25 of electrode 18 respectively, have been found to produce no adverse effect.

Figure 2:
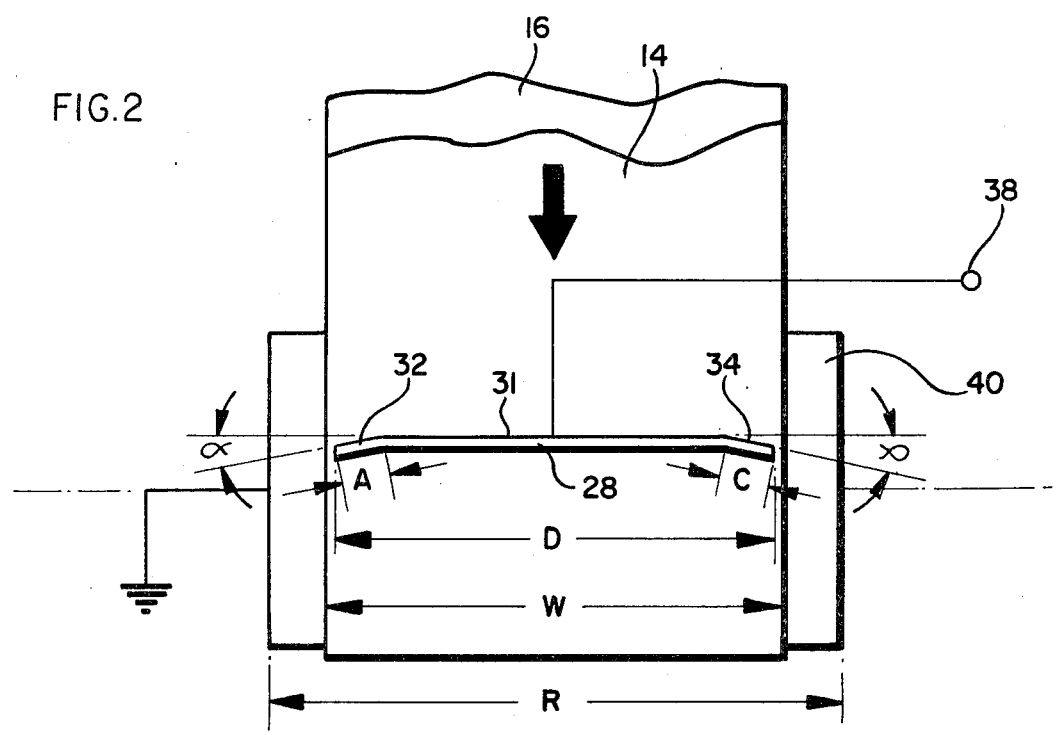

FIG. 2 illustrates a further embodiment in which angled end portions 32, 34, are produced without the severing step used in the embodiment of FIG. 1 but rather by simply bending the ends of a bar generally indicated at 28 at an angle alpha ($\alpha$) a predetermined distance A and C respectively from each end. The electrode generally indicated at 28 thus comprises a central straight portion 31 and two straight end portions 32, 34. In practice, it has been found that the distance A and C may be equal and may be in the order of $1\frac{3}{4}''$ where the "W" width of the material being bonded is 12" and in the order of 2" where the width of the material being bonded is 28". Under the same conditions, angle alpha ($\alpha$) is in the range of about 8 to 12 degrees. The same angle range of 8 to 12 degrees works for both the 12 and 28" widths and, although not tested, is expected to hold true for wider widths. This same angle range applies to the displacements of the portions 22 and 24 in FIG. 1.

Such less effective positioning of the end portions 22, 24, in FIG. 1 and 32 and 34 in FIG. 2, is outside the optimum point or optimum line of maximum effectiveness. According to the preferred embodiments, the bending from that optimum point or line is generally in a plane perpendicular to the plane extending through the axis of the grounded roll 40 and the straight portions 21 in FIG. 1 and 31 in FIG. 2. While the field strength will also be weakened by moving the electrodes 18 and 28 away from the roll 40 in a plane passing through the axis of the roll 40, it has been found that such movement leads to the breakdown of the corona and produces uneven bonding.

In FIG. 2 the width of the material 14, 16, is slightly greater than the overall effective length D of the corona electrode 28 a predetermined distance so that the corona will not short out directly to the roll 40. The width W, of the material, may be equal to or less than the width R of roll 40.

It will be understood from the referenced patents and the disclosure herein that a great number of variables must be considered in obtaining maximum effectiveness of the corona bonding process. In the prior art a straight electrode located at the line of greatest effectiveness produced a higher bond along the edges of the material. Thus, when proper bonding occurred in the central inward portion between the opposite edges of the material 14 and 16, the bond at the edge was substantially greater so at the separation station 80 it occurred that the edges in some cases did not separate but instead tore the material lengthwise along the line inwardly from the edge. This, of course, disrupted the reclamation process and wasted material.

The illustrated solution to the higher edge bond levels involve compensating for the higher energy levels experienced at the ends of the electrode by configuring the end of the electrode porportionately to the higher energy levels so the electrode ends were in a less effective position out of the optimum point or line.

Although only preferred embodiments of the inventions have been specifically illustrated and described herein, it is to be understood that minor variations may be made in the methods and apparatus without departing from the spirit and scope of the invention, as defined by the appended claims.

What is claimed is:

1. An apparatus for bonding together two or more layers of material generally uniformly across their common width, said apparatus comprising a ground means adapted to be positioned across the width of said layers of material on one side of said layers of material to be bonded and an electrode means adapted to produce a corona discharge positioned on the opposite side of said material from said ground means, said electrode means being of a length to extend substantially across said common width for producing an effectively uniform corona energy field across said common width of said layers of material, said electrode means having end portions adapted to be subject to an increased corona field strength, said end portions being configured to substantially compensate for said increased corona field stength to produce a generally uniform corona field across said common width whereby said layers of material are substantially uniformly bonded across their common width.

2. Apparatus according to claim 1 wherein said electrode means has an effectively linear central portion adapted to produce a generally uniform corona field along the length thereof and end portions not lying in the same line as said central portion, said end portions being configured generally in proportion to the higher corona energy levels found to occur along the end portions of said electrode means to compensate for said increased corona field whereby said end portions produce generally the same effective corona energy level relative to said layers of material as said central portion of said electrode means.

3. The apparatus of claim 2 wherein said end portions are generally straight and are inclined at an angle to the central portion in the range of about 8 to 12 degrees.

4. Apparatus according to claim 2 wherein the electrode is a straight flat bar having one edge toward a ground and wherein said end portions are formed from a portion of the bar nearest to the ground which has been severed along its length from the remainder of the electrode bar.

5. The apparatus according to claim 2 wherein said central portion has an effective corona field producing surface parallel to the axis of a grounded roll and is located on the opposite side of the material being bonded from said roll.

6. An apparatus for bonding together two or more layers of material generally uniformly across their common width, said apparatus comprising a ground means adapted to be positioned across the width of said layers of material on one side of said layers of material to be bonded and an electrode means adapted to produce a corona discharge positioned on the opposite side of said material from said ground means, said electrode means extending a predetermined distance across the width of said material comprising a central portion positioned along an optimum line for bonding generally uniformly spaced from said ground means, and end portions on opposite ends of said central portion, said end portions being adapted to have a greater corona field stength at each point along its length than the central portion, each point along the length of said end portions being effectively spaced from said ground means a distance generally proportionate to the increased strength of the corona field at such point of the end portion relative to said central portion whereby said material being bonded will be subject to a uniform corona bond across its width.

7. An apparatus according to claim 6 including means to vary the electrical energy adapted to be supplied to said electrode means to vary the intensity of the corona field produced by said electrode means and produce a correspondingly variable bond adhesion between the layers.

8. An apparatus according to claim 6 wherein said material is adapted to be in the form of at least two continuous webs which move between said ground roll and said electrode means under predetermined conditions.

9. An apparatus according to claim 8 wherein at least one of said webs is adapted to be polymer plastic formed by continuous extrusion adjacent said ground roll and said ground roll is a chill roll.

* * * * *